United States Patent [19]
Molenaar

[11] Patent Number: 6,124,112
[45] Date of Patent: *Sep. 26, 2000

[54] METHOD FOR THE PRODUCTION OF A FERMENTED COMPOST USING BACTERIA, FUNGI AND WORMS AT CONTROLLED TEMPERATURE

[76] Inventor: Jan Molenaar, Ijweg 486, 2141 CL Vijfhuizen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/841,715

[22] Filed: Apr. 30, 1997

Related U.S. Application Data

[63] Continuation-in-part of application No. 08/441,058, May 15, 1995, abandoned, which is a continuation of application No. 08/110,686, Aug. 23, 1993, abandoned.

[30] Foreign Application Priority Data

Aug. 24, 1992 [NL] Netherlands ............................ 9201500

[51] Int. Cl.[7] .................................................. C17B 39/00
[52] U.S. Cl. ............................ 435/42; 435/262; 435/244; 435/267
[58] Field of Search ............................... 435/41, 42, 262, 435/244, 267

[56] References Cited

U.S. PATENT DOCUMENTS

| | | | |
|---|---|---|---|
| 3,731,812 | 5/1973 | Stone | 210/199 |
| 3,963,470 | 6/1976 | Haug | 71/9 |
| 4,159,944 | 7/1979 | Erickson et al. | 210/6 |
| 4,302,546 | 11/1981 | Schlicting | 435/315 |
| 4,909,825 | 3/1990 | Eigner | 71/9 |
| 5,106,648 | 4/1992 | Williams | 427/3 |
| 5,144,940 | 9/1992 | Fiaroski | 126/427 |
| 5,240,611 | 8/1993 | Burton | 210/603 |

FOREIGN PATENT DOCUMENTS

| | | | |
|---|---|---|---|
| 2558257 | 7/1977 | Germany . | |
| 3017352 | 11/1987 | Germany . | |
| 0022555 | 2/1984 | Japan | 435/41 |

OTHER PUBLICATIONS

Hickman, CP, "Biology of the Invertebrates", Mosby Co., 1973 p. 409–413.
Cheremisinoff et al, "Biotechnology", Technomonic Co, 1985, p. 68–77.
Harley, J.L. "Biology of Mycorrhiza", 1959, p. 3.
Cheremisinoft, P.N., "Biotechnology", 1986, pp. 68–77.

*Primary Examiner*—Irene Marx
*Attorney, Agent, or Firm*—Smith Gambrell & Russell, LLP

[57] ABSTRACT

The invention relates to a method of production for a fermentation product, in which ripe compost is subjected to treatment with worms, bacteria and fungi, after which the fermentation product is dug off, and, if necessary, ground and sifted. After digging off the product, it can be pre-dehydrated at a temperature below 50° C., if one so wishes, then —if necessary—it can be ground and sifted, and be subjected to desiccation, during which the temperature of the fermentation product does not rise above 30° C. during the desiccation process. Ripe compost, consisting of vegetable, fruit and garden waste, is especially suitable as basic material. If one so wishes, the fermentation product can be pelleted before desiccation. The pellets can, for example, be used as floor cover in animal pens or as cat's box litter. The non-dried product is especially suitable as a supplement for garden and pot-plant soil.

8 Claims, No Drawings

METHOD FOR THE PRODUCTION OF A FERMENTED COMPOST USING BACTERIA, FUNGI AND WORMS AT CONTROLLED TEMPERATURE

This application is a continuation-in-part application of patent application Ser. No. 08/441,058, filed May 15, 1995, now abandoned which is a continuation application of patent application Ser. No. 08/110,686 filed Aug. 23, 1993, now abandoned.

INTRODUCTION AND BACKGROUND

The present invention relates to a method for the production of a fermentation product, which comprises the treatment of ripe compost with worms, bacteria and fungi. Such a fermentation product is—inter alia—suitable for use as a littering material in stables or cages of smaller animals (like pets), where it decomposes animal droppings.

German "Offenlegungsschrift" 2.558.257 describes a compost, obtained from waste of silt, of average maturation, water content between 30 and 55%, pH between 5 and 6, organic matter content between 55 and 70% and a fine-grained structure. This compost contains micro-organisms, nematodes and enchitreae. This compost is used as a floor-forming means in pens, where it decomposes animal droppings. The effects are limited however.

Such follows from the German "Offenlegungsschrift" 3.017.352, of the same applicant as DE-A-2.558.257, in which it is stated that the obtained compost had several disadvantages upon use as a littering material, which rendered it unsuitable for the proposed application. The problems mentioned are: short storability, shrinkage of the product during storage, adhering to a cat's fur when used as a littering material in a cat's box. It has an undefined crumbly structure, and it cannot be moulded into formed shapes.

DE-A-3.017.352 solves these problems by adding to the material a clay of plastic consistency. By doing this, it is possible to mould the material. However, the product obtained still has several disadvantages. Since, after pelletizing, the product must be stored for 10–20 days, whereby the temperature rises to about 60° C. This inherently means that the microorganisms which might have been present in the product, will be killed, with the exception of the high temperature organisms. This temperature rise also shows that the product obtained is not stable. A further disadvantage of adding clay to the compost product is that it is not allowed anymore to dispose of the product in bins intended for vegetables, fruit and garden waste. Moreover the process is not cost-effective, because of the long storage time needed.

The present inventor has confirmed that the compost obtained by DE-A-2.558.257 cannot be moulded in an extruder. One goal of the present invention is a method according to which ripe compost is treated so as to obtain a fermented compost, which at least should be very useful for decomposing animal excrements.

SUMMARY OF THE INVENTION

The present invention teaches a method, comprising:
(a) adding a first layer of ripe compost about 10–50 cm in height to a container wherein the temperature of said container is maintained at about 0–30° C.,
(b) adding worms, bacteria and fungi to said compost, wherein said worms belong to Lumbricideae, Eiseniae, Allolobophoreae, Dendrobaenae or are the African Nightcrawler; wherein said bacteria belong to *Pseudomonas fluorescens,* Cellovibrio, *Bacillus cereus,* Azotobacter, Flavobacterium or Rhizobium; and wherein said fungi belong to Aspergillus, Basidiomycetes, the Mycrorrhiza group, or low-temperature *Trichoderma harzianum* which become active at temperatures as low as 8° C.,
(c) incubating said compost for 80–120 days to produce a fermentation product,
(d) removing said fermentation product,
(e) predehydrating said fermentation product to a humidity of from about 25–35% at an air temperature of lower than about 50° C.,
(f) optionally grinding and sifting said fermentation product,
(g) pelletizing said fermentation product, and
(h) desiccating said fermentation product to a humidity of from about 10–15% at a temperature which does not rise above 30° C.

DETAILED DESCRIPTION OF THE INVENTION

The product obtained by the method according to the present invention has a number of advantages. One of these advantages is that the product, if used as a cat's box filling means, can be disposed of in bins for vegetable-fruit-and-garden-waste. The pelletized product of DE-A-3.017.352 cannot be disposed of in such bins, since it contains clay. Accordingly, the product of DE-A-3.017.352 should be disposed of in conventional bins for municipal waste, and consequently burdens environment to a high degree.

The product further can be moulded into formed shapes thereby obtaining a defined structure, which is completely stable, i.e. does not show shrinkage or a temperature rise during storage, which has a good liquid absorptivity and which is extremely useful as a littering material in cat's boxes.

The specific combination of organisms which is used in the present method is different from the combination mentioned by DE-A-2.558.257. In the product of that application the naturally occurring organisms are present, which can be found in usual compost-products.

On the contrary, according to the present method, specific organisms are added and these are developed under conditions as specified in the claims. Thanks to this method, an evenly balanced increase of all added organisms is obtained, by which a fermented compost is obtained as mentioned above, which is capable of decomposing any biological material, and animal droppings in particular, quickly and odourlessly, because of the micro-organisms still present in the product.

Because of the combination of active (micro)organisms and their excrements, containing enzymes which also are useful in the further decomposition of the compost, the product obtained has such a composition and structure that it can directly be press moulded with an extruder.

It has nowhere been described in the art that a compost, having a high maturity, can still be further decomposed by a combination of worms, bacteria and fungi, as in the present invention. Neither is there mention of a treatment of compost by which same is decomposed without development of heat. In the present process the compost starting material containing the organisms, has to be kept at a temperature of about 0–30° C. so as to ensure that the organisms added decompose the compost. Preferably, the temperature is kept in the range of about 23–27° C., which inherently means, in case the ambient temperature is below the preferred range, that the starting material has to be heated. No further temperature rise is recorded during the method.

The compost used as a starting material for the method according to the invention can be all kinds of known organic materials which can be consumed by worms. It therefore should have a certain maturity, which is indicated by the so-called (German) "Rottegrad-parameter" (rotting degree-parameter). This parameter may range from 1 to 5. A value of 1 means that the compost upon collection in a compost heap develops a maximum temperature of 60–70° C., whereas a value of 5 indicates a temperature rise to 30° C. maximally. Compost having a value of 5 is called ripe compost (vide "Methodenbuch zur Analyse von Kompost", Bundesgütegemeinschaft Kompost e.V., Köln, Germany). In ripe compost a certain decomposition of cellulose-type substances has been reached, so that no heating ensues. In the present invention a compost having a Rotting Degree parameter of 5 must be used. Accordingly, no heating ensues during the process of the present invention.

It is both possible to use sterile compost as a starting material and to use non-sterile compost as a starting material. Sterile compost, which does not contain any pathogenic bacteria, fungi, viruses and noxious insects, is e.g. obtained by a so called tunnel composting process. Herein, the process is carried out in a closed container in which the temperature and humidity can be controlled exactly. Only thermophilic organisms will survive such a process. In the case of non-sterile compost, it is preferred to use more inoculation material and albuminous nutrients, so as to displace the other organisms present.

The starting material should be free from harmful quantities of heavy metals and compounds like polycyclic aromatic hydrocarbons, polychlorinated biphenyls and polybrominated biphenyls. It is preferred that the fermentable material is ripe compost consisting of vegetable, fruit and garden waste. Stable manure or chicken manure can also be used as basic materials.

A few documents will be discussed hereafter, which however relate to the composting of fresh organic material.

U.S. Pat. No. 3,963,470 of Haug is directed to the drying of sewage sludge, thereby reducing the weight by evaporating the water. A temperature increase is obtained (140–155° F.≈60–70° C.). At such a temperature, the organisms which might be present will certainly die except for some thermophilic species. In column 4, line 63 it is mentioned that the addition of further organisms is not necessary. Therefore, the product as obtained according to the process of Haug, will only contain the naturally present organism. This inherently means that the process of Haug is a common composting process.

U.S. Pat. 4,302,546 of Schlichting Jr describes a composting process for organic waste, using thermal bacteria, in a rotating cylinder which continuously keeps the organic material in motion (vide Cheremisinoff: page 71, right column, line 21–22, discussed hereafter). The temperature of the material rises to about 80° C., which renders this process unsuitable for obtaining a ferment product, where all microorganisms should survive.

U.S. Pat. No. 4,909,825 of Eigner describes a process for drying damp excrements. For that purpose the excrements are subjected to an aerobic conversion process, where the temperature rises to about 80° C. There is a continuous flow of air (with additional oxygen if necessary). As it is stated, there is an addition of some microorganisms, however without stating which microorganisms should be added. A composting process then takes place (column 3, lines 56–57. Due to the high temperature obtained, only thermophilic organisms will survive.

U.S. Pat. 4,337,077 of Rutherford describes a so-called seed inoculant composition. Such a composition is distributed over seeds and delivers a bacterium, an enzyme or a hormone to the seed, thereby accelerating the germination or enhancing the growth of the plant (vide column 2, lines 44–48). Rutherford mainly describes in this patent the composition for treatment of seeds. That has nothing to do with the process of the present invention. Further, Rutherford describes a, as he calls it, fermenting process. However, during this process, the temperature rises to about 70° C. which means that this process in fact is a composting method. Rutherford uses additives like leather meal (10–20%), fine grained granite and limestone, which additives are unsuitable in the present application (leather meal contains proteins which favours the development of heat which is killing off the specifically added organisms, whereas inorganic substances make the disposing through the said bins impossible). Rutherford does not mention the use of worms, which are necessary in the present process. However, worms and most other organisms would not survive the process as taught by Rutherford, because of the high temperatures. Only thermophilic bacteria will survive such temperatures.

Cheremisinoff, in "Biotechnology: applications and research", page 68–77, describes composting processes wherein the temperature rises to about 70° C., which temperature rise is essential for the organisms and for obtaining a good conversion of the organic material. The organisms added are bacteria, fungi and actinomycetes. There is no mention of worms, which also would not be useful taking into account the high temperatures.

Cheremisinoff teaches that a temperature of 28° C. gives best results as to the breakdown of cellulose. However, a much higher temperature is needed for the breakdown of hemi-cellulose and lignine, according to Cheremisinoff. The process for the present application is directed to the fermentation of compost, which means that the cellulose in the material which is to be treated in the process of the present invention already has a reduced cellulose content. Surprisingly, the present process now renders it possible to break down the "tougher" organic materials without using the high temperatures.

Since the method according to the invention is performed at a constant temperature, all organisms present during the method will be present in the final product as well. All methods in the art, concerning the decomposition of organic materials, show a temperature rise, which means that only the thermophilic organisms will be found in the final product.

The basic material is treated in a controlled room, in which temperature and humidity are fully adjustable, with worms, bacteria and fungi. The temperature in this room is maintained at about 0–30° C., preferably at 23–27° C.

First of all, a layer of basic material with a height of about 10 to 50 cms, preferably circa 30 cms, is put in the room. To this material worms from one or more of the earlier-mentioned kinds are introduced, in quantities of about 50 to 250, preferably 80 to 120 specimens per $m^2$.

A mixture of various soil bacteria and fungi is also scattered across the layer of basic material. These bacteria may include the ones as mentioned before. The fungi also may include the ones as mentioned before.

To ensure the quick growth of worms and bacteria preferably a small quantity of albuminous nutrients are scattered across the basic material. This may be in the form of mealworm manure, in a quantity of about 80 to 120 grms/ m², or in the form of various kinds of calf-milk powder, in a quantity of about 40 to 60 grms/m² or in the form of blood powder. Blood powder contains about 80% of proteins. It is to be noted that preferably no high quantities of proteins or starch should be added to the material since starch favours the development and growth of naturally occurring fungi, thereby oppressing the specifically added fungi, and high quantities of proteins cause the development of heat. Of course, it is also possible to mix the worms, bacteria, fungi and/or the albuminous nutrients with the basic material instead of scattering them across it. Because scattering is technically easier, this process is preferred.

The worms and bacteria multiply quickly when these albuminous nutrients are present. When the albuminous nutrients have been consumed, the worms and bacteria are left with the harder to consume fermentable material. As a reaction to this the bacteria produce enzymes which can convert organic materials. The worms, which can consume quantities of organic materials in the order of their own body weight a day, will excrete digesting enzymes in their excrement.

When the layer, which was brought in first, is fully developed with worms, bacteria and fungi, after 80 to 120 days, a new layer of basic material can be applied, if one so wishes. This layer has a height of 5 cms, at most. Preferably, a mixture of albuminous nutrients, bacteria and fungi is mixed beforehand in a quantity of about 1 to 4 kgs food/m³ and about 0.5 to 1.5 kgs bacteria-mix/m³, before it is added to the basic material. The new layer is developed within about 2 to 5 days, after which a new layer can be added.

Before adding a new layer, a single sugar-acid is preferably applied to the existing layer, strengthening the enzymes, formed by bacteria and worms, and intensifying and accelerating in this way the fermentation process. Glucono-γ-lactone, or glucuronolactone, can be used in a quantity of about 1.75 to 5 grms/m².

It is also possible to confine oneself to a one-step procedure, which means that no new layers are added to the first layer. The multiple layer procedure is preferred, however, because it results in a fermentation product of a higher quality. Moreover, a multiple layer procedure is economically more efficient.

When the final layer is fully developed, removing can be started. In a multiple layer procedure this can generally start when the fermentation product layer has reached a height of at least 60 cms. First of all, the upper layer of about 5 to 15 cms, which contains the worms, is removed and put aside. Next the remainder of the fermentation product is dug off. It is often the case that the lowest 5 to 15 cms of the fermentation product are left as a basis for a new production layer. The layer containing the worms is then put on the lowest layer and covered with a new quantity of basic material, so that a new production process can start. Please note that, in case a one-layer procedure is followed and when a height of 30 cm is processed, it is not possible to use the upper limits of upper layer and basic layer.

The fermentation product which has been dug off, is pre-dehydrated at an air temperature of 50° C. at most, to avoid sterilization. The temperature of the product itself will not rise above 30° C. in this stage of pre-dehydration, even not when the air has a temperature of about 50° C., since the product contains a certain amount of water. When the product is air-dried, at a humidity of about 25 to 35%, the fermentation product can, if necessary, be ground and sifted. The fermentation product, depending on its eventual use, can be desiccated after grinding and sifting, or granulated before desiccation. This can be done through granulating or pelleting. After the interception and extraction of the dust, originating during desiccation and working up, this dust can be added as supplement to the fermentation product before pelleting or granulating. In the same way, organic additives, for example attractives for a particular group of animals, or extra sugar-acid can be used as a supplement.

During the desiccation process, the bacteria and fungi are forced back to spore level. During the desiccation process the temperature of the fermentation product must not rise above 30° C. to avoid killing off the bacteria and fungi. Desiccation can, for example, be done in a silo with ventilation air of at most 30° C. Since the product to be desiccated contains less water than during pre-dehydration, the temperature of the air should be no higher than 30° C. After desiccation the humidity of the fermentation product will be about 10 to 15%. After desiccation there will be a final product, ready for packing, its qualities guaranteed for at least one year.

The fermentation products and the pellets, according to the invention, have many applications. For example, the pellets can be used as litter in pets' pens; as a means of degrading oils and greases, for example, on garage floors; or as a filter material in purification systems, for example to filter polluted effluent from plant nutrient systems. Other applications are also possible. The pellets are especially useful as cat's box litter.

The fermentation product, dried or not dried, is suitable, for example, as a supplement to garden and pot-plant soil, or as a fermentation starter in bins for vegetable, fruit and garden waste, where its use will reduce stench.

The fermentation product contains intestinal flora and enzymes originating from the worms, bacteria and fungi with which it has been prepared. The bacteria and fungi are moreover in survival form, for example, at spore level, present in the desiccated fermentation product. They are present, naturally, in the non-dried product.

If the fermentation product is moisturized through urine, for example, in the case of pellets used in pets' pens, the organisms resume life again. Fungi occupy the droppings, produced by animals, in the dry area and grow mouldy. Animal diseases, which are excreted in the droppings, will be encapsulated and broken down by the bacteria, fungi and enzymes. In closed rooms, the bacteria and fungi will transform, among other things, the ammonia, which is produced by the naturally present urea fermentators present in urine, into nitrate (=nitrification) and nitrogen (=denitrification).

In this way the droppings will be decomposed odourlessly through the cat's box litter. The total saturation point of the pellets, expressed in percentage of weight, is about 200%. When used as cat's box litter, it is replaced when the weight increases to about 100 to 125%.

The size of the fermentation pellets depends on its application. Generally, the diameter is 4 to 10 mm, with a length of 10 to 30 mm. Preferably, the pellets are round, but other forms are also possible. When used as cat's box litter, the pellets have a diameter of 5 to 6 mm and a length of 15 to 20 mm. When used for smaller domestic animals, such as pigeons, cage-birds, hamsters, rabbits and so on, the diameter of the pellet size is, preferably, 4 to 5 mm with a length of about 10 mm. When used in stables or zoos, for example, for horses, pigs and so on, the preferred diameter of the pellets is 8 to 10 mm with a length of 25 to 30 mm.

After use, the pellets of the fermentation product can be homogenized and put back to the first step of the production process. Up to a quarter of the basic material may consist of used fermentation product. A supplement of the fermentation product is suitable—after and, if preferred, before—for application as fertilizer or as a supplement to garden or pot-plant soils.

EXAMPLES

Example 1

The floor of a controlled room, with a temperature of about 25° C., was covered with ripe compost consisting of vegetable, fruit and garden waste. The layer was about 30 cms high. Worms were scattered across in quantities of circa 100 specimens per $m^2$. The worms belonged to the kinds of Lumbricideae and Eisenieae, in a 50—50% ratio. Next, a mixture of soil fungi and bacteria, which are generally available, was scattered across the compost, in a quantity of about 100 grms/$m^2$, followed by the scattering of meal-worm manure in a quantity of about 100 grms/$m^2$. After 100 days the layer was completely developed. This layer was then covered with about 5 grms/$m^2$ of Glucono-γ-lactone, after which a new layer of compost was added to the existing layer, with a height of about 5 cms. Beforehand, the new compost was mixed with about 2 kg of meal-worm manure and about 1 kg of bacteria mix per $m^3$. After 3 days the new layer was completely developed, and, after the scattering of about 3.5 grms/$m^2$ of sugar-acid, a new layer, mixed with bacteria and meal-worm manure, was added again. This process was continued till the layer had reached a height of about 75 cms. At that point, the upper layer of about 15 cms, containing the worms, was dug off, after which about 50 cms of the product was removed. The lowest layer of about 10 cms remained intact.

The product, which has been dug off, was pre-dehydrated to a humidity of about 30%. Next, it was ground and sifted in a sieve with a mesh width of 3 mm, and pelleted into grains with a diameter of 5 mm and a length of 15 mm. The pellets, produced in this way, were desiccated to a humidity of about 10%. This product turned out to be excellent cat's box litter (vide Example 5).

The layer, containing the worms, dug off before production was scattered across the lowest layer. Next, this layer was covered again with a ripe compost from vegetable, fruit and garden waste, across which bacteria and meal-worm manure were again scattered. In this way the production process started again.

Example 2

The production method in Example 1 was repeated, except for the fact that the product was not dried or pelleted after removing but was used at once as a supplement for pot-plant soil. Such use yields an improved growth of the plants, at the same time diminishing the need of adding fertilizer. Also, the plant's roots showed an improved resistance against e.g. root diseases.

Example 3

The production method, according to the invention, is carried out in a controlled box, with a length×width×height of 500×100×60 cms. At the backside of the box there is a digging-cylinder, and in the box there is a bottom-chain with bars with which the contents of the box can be moved into the direction of the digging-cylinder. The machine reminds one of a dung spreader. In the box is put a layer with a height of about 15 cms of old stable dung with a Carbon/Nitrate ratio of less than 30:1. Worms are added in quantities of about 200 specimens per $m^2$, and about 0.2 kg/$m^2$ of bacteria and fungi mix and about 0.6 kg/$m^2$ of albuminous nutrients are scattered across the layer.

After approximately 3 months the worms will have increased to such an extent that the adding of new layers of basic material can be started. At first, once a week a new layer is added, because the maximum quantity of around 100,000 specimens per $m^2$ has not been reached. Adding new layers will be done in such a way that there will develop a sloping line in the direction of the digging-cylinder. At the highest side the new layer will always have a height of around 5 cms, which will result in a growth of the layer of fermentation product of around 3.5 cms. After approximate another 3 months the layer of fermentation product at the highest side will have reached a height of 60 cms, and digging off can start.

In the final 35 cms of the box, seen from the side where the digging-cylinder is attached, the temperature of the fermentation product will be increased to around 40° C. by an external heat source place at the bottom side of the layer. In this way the worms are driven to the upper part of the fermentation product layer. By moving the bottom-chain, the fermentation product is shifted against the digging-cylinder, and in that way removed out of the box. In this way the upper 10 cms of the fermentation product, viz. the layer containing the worms, are shifted, at the same time, onto a sheet, which is situated at 50 cms from the bottom, in front of the digging-cylinder in the box. The layer containing the worms, which is on the sheet, is caught, and deposited in the space which is cleared by the shifting of the fermentation product.

Now, 3 times a week, a layer of basic material with a height of around 2.5 cms is added. Before adding the new layer, around 0.6 grms of sugar-acid per $m^2$ is scattered across the old layer. Across the new layer is then scattered a mixture of albuminous nutrients, bacteria and fungi.

This continuous production method will result, at a maximum dig-off speed of 7.5 cms a day, in a fermentation production of 30 to 35 Litres of high-quality product a day, which can be subjected to the prescribed treatment and used for many suitable applications.

Example 4

The method of example 3 is repeated, except that in stead of old stable dung now old chicken dung was used as the basic material. The dung used had a Carbon/Nitrate ratio of less than 30:1.

The product obtained is of the same quality as the product obtained in example 3.

Example 5

In this example a comparison is given of the pelletized product obtained in the method of example 1 with the pelletized product of DE-A-3.017.352.

The product obtained in example 1 was pelletized according to the present invention. The product of DE-A-3.017.352 contained some clay, since the organic material itself, which was the product of DE-A-2.558.257, could not be pelletized. After pelletizing said product, a temperature rise was observed with a maximum of about 60° C.

In each case, a cat's box was filled with a standard amount of pellets. After three days the cat's box containing the product of DE-A-3.017.352 caused an unbearable odour, while the cat's box containing the product of the present invention (according to example 1) only had to be replaced after three weeks (twenty one days).

It is assumed that the better performance of the product obtained according to example 1 is due to the microorganisms which become active again upon wetting of the product when the cat relieves itself and upon which the micro organisms start degrading the cat's excrements.

Example 6

The storability of the pelletized product obtained according to the method of the present invention was assessed.

The pellets were stored in a paper bag at room temperature and in a dry atmosphere.

After three years the pellets showed the same activity as originally and the performance when used in a cat's box was equal to the results of example 5.

Further variations and modifications of the foregoing will be apparent to those in skilled in the art and are intended to be encompassed by the claims appended hereto.

Netherlands priority application 92 01500 is relied on and incorporated herein by reference.

I claim:

1. A method for the production of a fermented compost, said method comprising the following steps:
   (a) adding a first layer of ripe compost about 10–50 cm in height to a container wherein the temperature of said container is maintained at about 0–30° C.,
   (b) adding worms in an amount of 50–250 specimens/m$^2$ and adding a mixture of bacteria and fungi in an amount of 0.5 to 1.5 kgs/m$^3$ to said ripe compost, wherein said worms are at least one member selected from the group consisting of Lumbricideae, Eiseniae, Allolobophorea, Dendrobaenae and the African Nightcrawler; wherein said bacteria are at least one member selected from the group consisting of *Pseudomonas fluorescens,* Cellovibrio, *Bacillus cereus,* Azotobacter, Flavobacterium and Rhizobium; and wherein said fungi are at least one member selected from the group consisting of Aspergillus, Basidiomycetes, Mycorrhiza, and a low-temperature *Trichoderma harzianum,*
   (c) incubating said ripe compost for 80–120 days to produce a fermented compost,
   (d) removing said fermented compost,
   (e) predehydrating said fermented compost to a humidity of from about 25–35% at an air temperature of lower than about 50° C.,
   (f) pelletizing said fermented compost, and
   (g) desiccating said fermented compost to a humidity of from about 10–15% at a temperature of up to 30° C.

2. The method according to claim 1, wherein in step (a) said ripe compost consists of vegetable, fruit and garden waste.

3. The method according to claim 1, wherein in step (b) said worms, bacteria and fungi are scattered across said ripe compost.

4. The method according to claim 1, wherein the temperature in step (a) is 23–27° C.

5. The method according to claim 1, wherein in step (b) said worms are added in an amount of about 80–120/m$^2$.

6. The method according to claim 1, further comprising after step (c) the following:
   (i) optionally adding a single sugar-acid on top of said first layer,
   (ii) adding a layer of no more than about 5 cm of a mixture of ripe compost, albuminous material, bacteria, and fungi on top of said first layer,
   (iii) incubating for 2–5 days,
   (iv) optionally repeating steps (i)–(iii),
   (v) removing the top 5–15 cm from said container and performing step (d) by removing said fermentation product down to 5–15 cm from the bottom of said container.

7. The method according to claim 6, wherein said sugar-acid is glucono-γ-lactone and/or glucuronolactone in a total quantity of about 1.75–5 g/m$^2$.

8. A method according to claim 7, wherein the fermented compost is ground and sifted prior to said pelletizing step.

* * * * *